United States Patent [19]
Berg

[11] Patent Number: 5,402,523
[45] Date of Patent: Mar. 28, 1995

[54] COMBINED MOBILE RADIO COMMUNICATION SYSTEM

[75] Inventor: Jan-Erik Berg, Johanneshov, Sweden

[73] Assignee: Telefonaktiebolaget L M Ericsson, Stockholm, Sweden

[21] Appl. No.: 228,006

[22] Filed: Apr. 15, 1994

Related U.S. Application Data

[63] Continuation of Ser. No. 935,913, Aug. 27, 1992, abandoned.

[30] Foreign Application Priority Data

Aug. 30, 1991 [SE] Sweden ............................ 9102492

[51] Int. Cl.$^6$ .............................................. H04Q 7/00
[52] U.S. Cl. .................................. 455/33.4; 455/34.1; 455/56.1; 455/67.1
[58] Field of Search ...................... 455/33.1, 33.4, 34.1, 455/34.2, 54.1, 56.1, 62, 63, 9, 67.1; 379/59, 60, 63

[56] References Cited

U.S. PATENT DOCUMENTS

| | | |
|---|---|---|
| 4,144,411 | 3/1979 | Frenkiel . |
| 4,790,000 | 12/1988 | Kinoshita . |
| 4,881,271 | 11/1989 | Yamauchi et al. ............... 379/59 |
| 5,040,238 | 8/1991 | Comroe et al. ............... 455/33.4 |
| 5,193,101 | 3/1993 | McDonald et al. ............ 455/33.4 |
| 5,212,805 | 5/1993 | Comroe et al. ............... 455/33.1 |

OTHER PUBLICATIONS

International-Type Search Report dated 1 Apr. 1992.
International Publication No. WO 89/04569.
Patent Abstract of Japan, vol. 13, No. 301 (E-785), abstract of JP1-078535, published 24 Mar. 1989.

Primary Examiner—Reinhard J. Eisenzopf
Assistant Examiner—Nguyen Vo
Attorney, Agent, or Firm—Burns, Doane, Swecker & Mathis

[57] ABSTRACT

A combined mobile radio communication system comprises a first mobile radio communication system with a first geographic coverage area and with first base and mobile stations and allocated a first set of radio channels within a first frequency band for transmission from the first mobile stations to the first base stations and a second set of radio channels within a second frequency band for transmission from the first base stations to the first mobile stations. Included is also a second mobile radio communication system with a second geographic coverage area, which at least partially coincide with the first geographic coverage area, and with second base and mobile stations and allocated a third set of radio channels within a third frequency band, which at least partially coincides with the first frequency band, but is different from the second frequency band, for transmission both from the second mobile station to the second base stations and vice versa. A detector within the second geographic coverage area detects radio signals within the second frequency band and an estimator estimates the disturbance risk from the second mobile radio communication system at said first base stations with the aid of the signal strengths of the detected radio signals.

12 Claims, 2 Drawing Sheets

COMBINED MOBILE RADIO COMMUNICATION SYSTEM

TECHNICAL FIELD

This application is a continuation of application Ser. No. 07/935,913, filed Aug. 27, 1992, now abandoned.

The present invention relates to a combined mobile radio communication system comprising a first mobile radio communication system and a second mobile radio communication system.

BACKGROUND OF THE INVENTION

Within larger geographical areas, that are covered by regional mobile radio communication systems, there is a need for local mobile radio communication systems that cover areas that comprise only a smaller part of the area covered by the regional mobile radio communication system. The local system can for instance be a system that covers essentially only an office building, where a company that uses the office building has a private branch exchange communicating with pocket phones over local base stations instead of a conventional exchange with stationary telephone sets connected to the exchange with cables. The base stations of the local system are in this case arranged at a much higher density and have a shorter range than the regional system. The pocket phones also have a much shorter range. Furthermore, the pocket phones are not moved as rapidly as mobile stations in the regional system. The pocket phones can therefore be designed simpler, more inexpensive and smaller than mobile stations in the regional system.

However, when the regional and local mobile radio communication systems are present in the same area, a frequency shortage arises if they are supposed to have separate frequency bands. On the other hand, if they are allowed to have the same frequency band, there is a risk that the local system will disturb the regional system.

From U.S. Pat. No. 4,790,000 a combined mobile radio communication system is previously known, in which a regional cellular mobile telephony system co-exists with a local private mobile telephone system located within the regional mobile telephony system. In the previously known combined mobile radio communication system, the regional mobile telephony system is divided into several large areas, each such large area being further subdivided into several cells. Within each cell a certain number of radio channels with given frequencies are used. The radio channels in the different cells in a large area have different frequencies. However, these frequencies are repeated between the large areas in accordance with a certain pattern. This arrangement prevents the different cells from disturbing each other since the distance between the cells in question is sufficiently large. The local mobile telephony system is located in a cell within a large area and also uses the same radio channels as the cells in the large area. However, the local mobile telephony system is prevented from using the same radio channels as that cell in which the system is located. Due to the local character of the local mobile telephony system and the implied low signal strengths, the system will not disturb neighbouring cells in spite of the fact that the same radio channels are used. A drawback of this previously known system, however, is that it is not possible to let both the local and regional systems use the same radio channels in that cell in which the local system is located.

A further drawback is that the frequencies that have been allocated to the local system will have to be changed if the frequency plan of the regional system is changed or if a cell splitting is performed in that system.

SUMMARY OF THE INVENTION

An object of the present invention is to let the local system at least partially use, in that cell in which the local system is located, the same frequency band as the regional system without disturbing the latter.

In previously known cellular mobile radio communication systems of FDD-type, Frequency Division Duplex, the mobile stations transmit radio signals to the base station within a first frequency band, while the base stations transmit radio signals to the mobile stations within a second frequency band, that is different from the first frequency band.

In other previously known cellular mobile radio communication systems of for instance TDD-type, Time Division Duplex, the mobile stations transmit radio signals to the base stations and the base stations transmit radio signals to the mobile stations within one frequency band that completely or partially coincides with at most one of the above mentioned first and second frequency bands.

This relationship between the systems can, in accordance with the present invention, be used to achieve the above object.

Thus, the above object is achieved by a combined mobile radio communication system, which comprises (a) a first mobile radio communication system with a first coverage area and with first base and mobile stations and allocated a first set of radio channels within a first frequency band for transmission from said first mobile stations to said first base stations and a second set of radio channels within a second frequency band for transmission from said first base stations to said first mobile stations, (b) a second mobile radio communication system with a second geographic coverage area, that at least partially coincides with said first geographic coverage area, and with second base and mobile stations and allocated a third set of radio channels within a third frequency band, which at least partially coincides with said first/second frequency band but is different from said second/first frequency band, for transmission both from said second mobile stations to said second base stations and vice versa, (c) means within said second geographic coverage area for detecting radio signals within said second-/first frequency band, and (d) means for estimating the disturbance risk from said second mobile radio communication system at said first base stations/mobile stations with the aid of the signal strength of said detected radio signals.

BRIEF DESCRIPTION OF THE DRAWINGS

The invention, together with further objects and advantages thereof, may best be understood by making reference to the following description taken together with the accompanying drawings, in which.

DETAILED DESCRIPTION OF THE PREFERRED EMBODIMENTS

Figure 2:
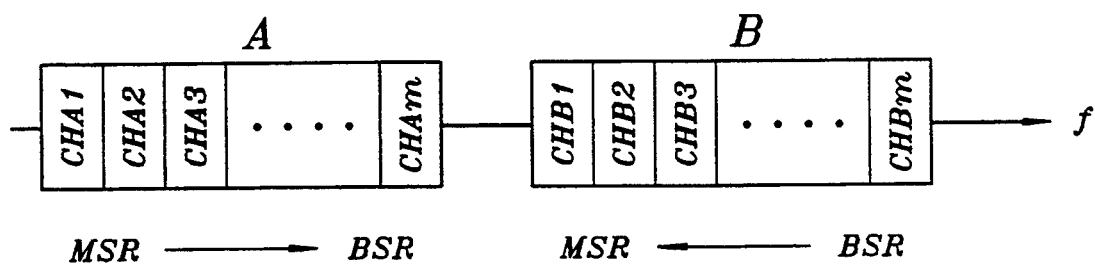
FIG. 2 shows the frequencies used by the regional mobile radio communication system.

The regional system R is an analog or digital cellular mobile radio communication system of FDD-type, where mobile stations MSR transmit radio signals to base stations BSR on radio channels CHA1, ..., CHAm within a first frequency band A. Base stations BSR transmit radio signals to mobile stations MSR on radio channels CHB1, ..., CHBm within a second frequency band B, that is different from said first frequency band (see FIG. 2). The regional system R can have, but does not require a fixed frequency plan.

Figure 3:
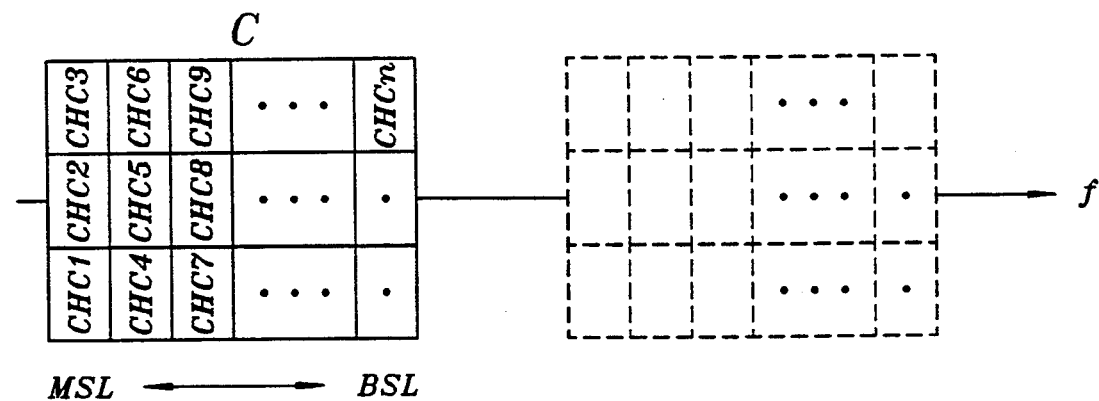
FIG. 3 shows the frequencies used by the local mobile radio communication system.

The local system L is an analog or digital cellular mobile radio communication system, in which mobile stations MSL transmit radio signals to base stations BSL on radio channels CHC1, ..., CHCn within a certain frequency band C (FIG. 3). The local system L can for instance be of TDD-type, in which a common third frequency band C through time division is used by both base stations and mobile stations. In the example shown, three radio channels share the same frequency. However, it is also possible to use both fewer and more channels per frequency. The example shown refers to a digital system, but the invention can also be used in an analog system, in which transmission and reception occurs within the same frequency band. The local system L normally has no fixed frequency plan but uses adaptive channel allocation.

Frequency band C of the local system L at least partially and preferably completely coincides with one of the frequency bands of the regional system R, for instance frequency band A (see FIG. 3). In this case frequency band C does not at all overlap frequency band B. Alternatively frequency band C partially or completely coincides with frequency band B and not at all with frequency band A. This possibility has been indicated by the dashed part of FIG. 3. The fact that only one of frequency bands A and B is used by both the regional system R and the local system L is utilized by the present invention, which will be further described below. For the sake of simplicity the following description will be directed to one of the cases, namely the case in which frequency bands A and C at least partially coincide.

Local system L comprises means for detecting radio signals within the second frequency band B. These means can comprise at least one antenna 10 with corresponding monitoring receiver 12. The antenna 10 preferably is positioned such that it has a lower propagation damping to the base stations BSR of regional system R than the base stations BSL of the local system L. The antenna 10 can for instance be positioned on the roof of a building, while all the base stations BSL in the local system L can be positioned within the building. Local system L comprises further means, for instance positioned in the base station controller BSC of the local system, for estimating, with the aid of the signal strength of the detected signals within the second frequency band B and known transmitter powers of the base stations BSL and the mobile stations MSL, respectively, in the local system L, the risk of disturbance in the base stations BSR of the regional system R in connection with transmission that might occur on a certain radio channel in the local system L.

The detection of radio signals in the local system L is performed for those channels in B that have corresponding duplex channels in A that completely or partially coincide with channels in the local system L. The detection can be performed by measuring frequency band B channel by channel. This measurement is cyclically repeated. A predetermined security margin for non ideal receiver and transmitter characteristics is added to the measured results.

The local system L also comprises means for preventing base and mobile stations BSL, MSL in the local system to transmit on the radio channel in question if the risk for disturbance is estimated to be unacceptable at at least one of the base stations BSR of the regional system R. If the radio channel in question is used for a call in progress these, means initiate a change of radio channel. The means can be included in the monitoring receiver 12 or in the base station controller BSC. In a preferred embodiment, decisions regarding change of channel are made in the monitoring receiver 12, whereafter a change of channel is ordered over base station controller BSC.

In the same way as previously known systems with adaptive channel allocation, the local system L comprises means (not shown) for measuring the disturbance level in radio channels that are used in the system and to refrain from using and initiating change of channel, respectively, when the disturbances are too high. Since the mobile stations MSR in the regional system R at least partially transmit in the same frequency band as the base and mobile stations BSL, MSL in the local system L, the latter system automatically will consider possible disturbances from mobile stations MSR of the regional system R and automatically avoid radio channels that are disturbed by regional system R. Thereby, the local system L will also automatically avoid disturbing transmission from the mobile stations MSR of the regional system R.

Figure 1:
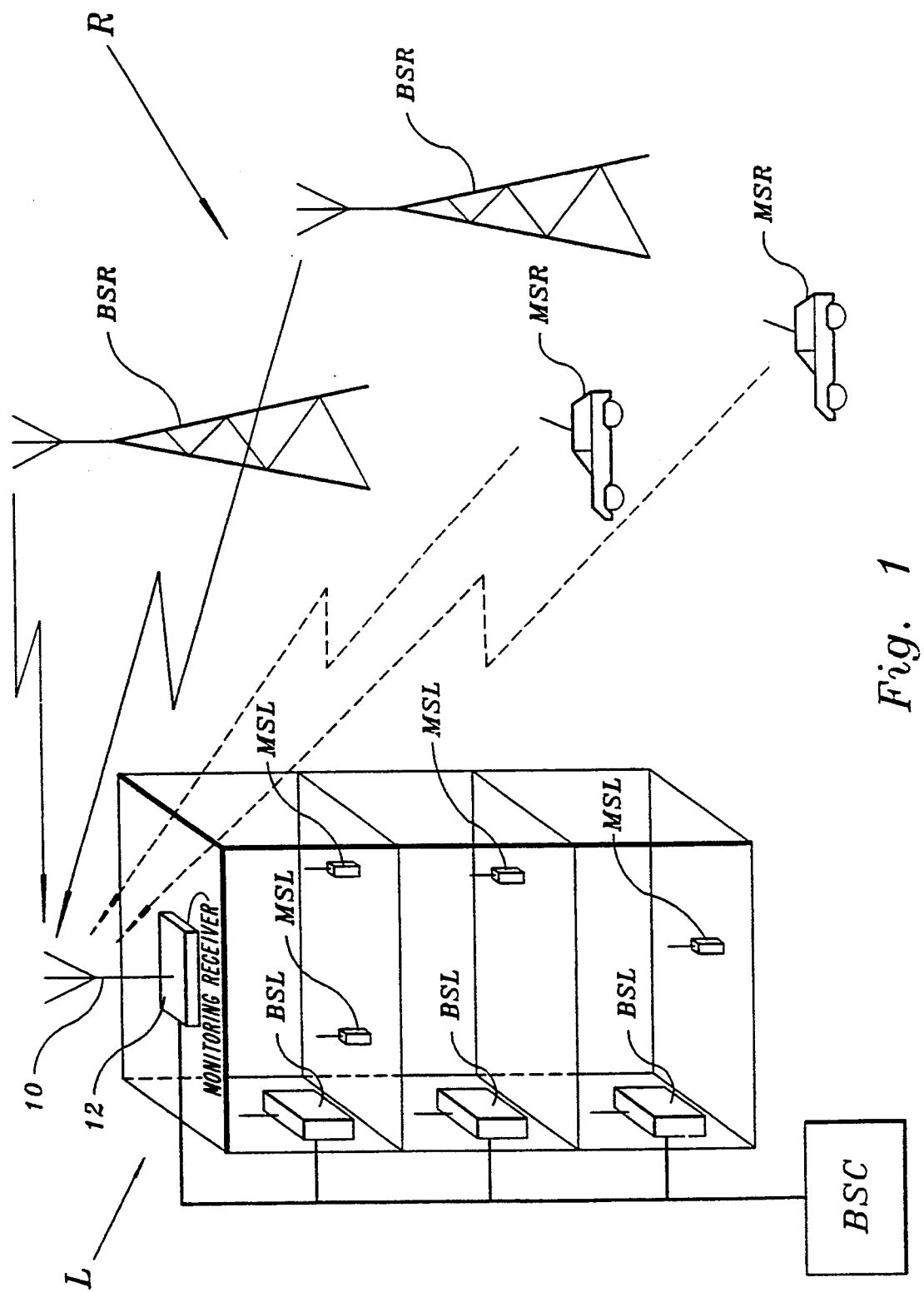
FIG. 1 shows a combined mobile telephony system in accordance with the invention.

If the frequency band C completely or partially coincides with the frequency band B the measurements are performed on frequency band A instead of on frequency band B. Thus, in this case, signals from mobile stations MSR are measured. This has been indicated by dashed lines in FIG. 1.

It will be understood by those skilled in the art that various modifications and changes may be made to the present invention without departure from the spirit and scope thereof, which is defined by the appended claims.

I claim:

1. A combined mobile radio communication system, comprising:
   (a) a first mobile radio communication system with a first geographic coverage area and with first base and mobile stations and allocated a first set of radio channels within a first frequency band for transmission from said first mobile stations to said first base stations and a second set of radio channels within a second frequency band for transmission from said first base stations to said first mobile stations,
   (b) a second mobile radio communication system with a second geographic coverage area, which at least partially coincides with said first geographic coverage area, and with second base and mobile stations and allocated a third set of radio channels within a third frequency band, which at least partially coincides with said first frequency band for transmission both from said second mobile stations to said second base stations and vice versa, (c) means within said second geographic coverage area for detecting radio signals within said second frequency band, and (d) means within said second mobile radio communication system for estimating the disturbance risk from said second mobile radio communication system with the aid of signal strengths of said detected radio signals.

2. The mobile radio communication system of claim 1, wherein said second mobile radio communication system comprises means for preventing that a certain radio channel within the third frequency band is used in the second radio communication system if its disturbances are estimated to be unacceptable at at least one of said first base stations or said first mobile stations in said first mobile radio communication system.

3. The mobile radio communication system of claim 1, wherein said second mobile radio communication system comprises second means for estimating the disturbance risk on radio channels within said third frequency band irrespective of whether the disturbances originate from said first or said second mobile radio communication system, and in that the second mobile radio communication system comprises means for preventing that a base or mobile station in said second mobile radio communication system uses a radio channel within said third frequency band subjected to disturbances, which are estimated to be unacceptable from remaining base or mobile stations in said first or said second mobile radio communication system.

4. The mobile radio communication system of claim 1, wherein said means for detecting radio signals within said second frequency band are positioned in such a way that they have a lower propagation damping to surrounding first base stations and mobile stations in said first mobile radio communication system than said second base stations in said second mobile radio communication system.

5. The mobile radio communication system of claim 1, wherein said first coverage area is essentially larger than said second coverage area.

6. The mobile radio communication system of claim 5, wherein said second coverage area is included completely in said first coverage area.

7. A combined mobile radio communication system, comprising:

(a) a first mobile radio communication system with a first geographic coverage area and with first base and mobile stations and allocated a first set of radio channels within a first frequency band for transmission from said first mobile stations to said first base stations and a second set of radio channels within a second frequency band for transmission from said first base stations to said first mobile stations, (b) a second mobile radio communication system with a second geographic coverage area, which at least partially coincides with said first geographic coverage area, and with second base and mobile stations and allocated a third set of radio channels within a third frequency band, which at least partially coincides with said second frequency band for transmission both from said second mobile stations to said second base stations and vice versa, (c) means within said second geographic coverage area for detecting radio signals within said first frequency band, and (d) means within said second mobile radio communication system for estimating the disturbance risk from said second mobile radio communication system with the aid of signal strengths of said detected radio signals.

8. The mobile radio communication system of claim 7, wherein said second mobile radio communication system comprises means for preventing that a certain radio channel within the third frequency band is used in the second radio communication system if its disturbances are estimated to be unacceptable at at least one of said first base stations or said first mobile stations in said first mobile radio communication system.

9. The mobile radio communication system of claim 7, wherein said second mobile radio communication system comprises second means for estimating the disturbance risk on radio channels within said third frequency band irrespective of whether the disturbances originate from said first or said second mobile radio communication system, and in that the second mobile radio communication system comprises means for preventing that a base or mobile station in said second mobile radio communication system uses a radio channel within said third frequency band subjected to disturbances, which are estimated to be unacceptable from remaining base or mobile stations in said first or said second mobile radio communication system.

10. The mobile radio communication system of claim 7, wherein said means for detecting radio signals within said first frequency band are positioned in such a way that they have a lower propagation damping to surrounding first base stations and mobile stations in said first mobile radio communication system than said second base stations in said second mobile radio communication system.

11. The mobile radio communication system of claim 7, wherein said first coverage area is essentially larger than said second coverage area.

12. The mobile radio communication system of claim 11, wherein said second coverage area is included completely in said first coverage area.

* * * * *